(12) United States Patent
Feichtinger et al.

(10) Patent No.: US 7,045,742 B2
(45) Date of Patent: May 16, 2006

(54) SYSTEM FOR CARRYING OUT A WELDING PROCESS

(75) Inventors: Josef Feichtinger, Thalheim bei Wels (AT); Peter Mair, Wels (AT)

(73) Assignee: Fronius International GmbH, Pettenbach (AT)

( * ) Notice: Subject to any disclaimer, the term of this patent is extended or adjusted under 35 U.S.C. 154(b) by 142 days.

(21) Appl. No.: 10/433,871

(22) PCT Filed: Dec. 5, 2001

(86) PCT No.: PCT/AT01/00382

§ 371 (c)(1),
(2), (4) Date: Jun. 4, 2003

(87) PCT Pub. No.: WO02/47860

PCT Pub. Date: Jun. 20, 2002

(65) Prior Publication Data
US 2004/0026392 A1    Feb. 12, 2004

(30) Foreign Application Priority Data
Dec. 11, 2000 (AT) .............................. A 2050/2000

(51) Int. Cl.
*B23K 9/10* (2006.01)
(52) U.S. Cl. .................................................... 219/132
(58) Field of Classification Search ................ 219/132, 219/130.5, 137 PS, 130.1
See application file for complete search history.

(56) References Cited

U.S. PATENT DOCUMENTS

| 5,956,399 | A |   | 9/1999 | Whitley et al. |
| 6,166,506 | A | * | 12/2000 | Pratt et al. ............. 318/568.12 |
| 6,315,186 | B1 | * | 11/2001 | Friedl et al. ................ 228/102 |
| 6,643,561 | B1 | * | 11/2003 | Torvinen .................... 700/166 |

FOREIGN PATENT DOCUMENTS

| DE | 29715731 |   | 1/1998 |
| EP | 1043107 | A2 * | 10/2000 |
| EP | 1112800 | A1 * | 7/2001 |
| JP | 58-107272 | A * | 6/1983 |
| JP | 10305366 |   | 11/1998 |
| JP | 12137512 |   | 5/2000 |
| SU | 1659181 |   | 6/1991 |

\* cited by examiner

*Primary Examiner*—Clifford C. Shaw
(74) *Attorney, Agent, or Firm*—Collard & Roe, P.C.

(57) ABSTRACT

The invention relate to a system, for example a welding system, for running a welding process or related process, having at least one wirelessly communicating component with a transmitter and/or receiver system. At least one mounting unit (28) is provided in the various components of the system, in particular the welding system, which can be fitted with a communication module (29) and at least one connecting mechanism of the mounting unit (28) is connected to an internal data transmission system (32) of the system, in particular the welding system. At least one mounting unit (28) is equipped with a communication module (29) in order to run a signal and/or data transmission.

29 Claims, 4 Drawing Sheets

SYSTEM FOR CARRYING OUT A WELDING PROCESS

CROSS REFERENCE TO RELATED APPLICATIONS

Applicants claim priority under 35 U.S.C. §119 of AUSTRIA Application No. A2050/2000 filed on 11 Dec. 2000. Applicants also claim priority under 35 U.S.C. §365 of PCT/AT01/00382 filed on 5 Dec. 2001. The international application under PCT article 21(2) was not published in English.

The invention relates to a system for running a welding process or a process of a related type, with at least one component which communicates wirelessly, as described in claim 1, and a method of welding or running processes of a related type, whereby at least one component of the system is or becomes connected to at least one other component of the system or to another system, as described in claim 22.

Document WO 99/36219 discloses a control system for a welding device and a welding plant, consisting of a welding torch linked to the welding apparatus by means of connecting lines. The welding torch co-operates with at least one input device or a display device. The control system in the welding apparatus is connected to a serial data bus, in particular a field bus, to which the welding torch and/or other components of the welding system are connected. A serial data exchange is operated between the welding torch and the control system of the welding apparatus or the welding system via the data bus, and all the electronic components needed for the data exchange are housed in the welding torch. Another possibility is mentioned, whereby the data transmission can be effected wirelessly, at least between certain part-regions of the welding apparatus and the components of the welding apparatus, in particular the welding torch, or external components, e.g. by means of light signals such as infrared signals, and a standardised or uniform data protocol is used by the individual components for the wireless data transmission. However, it is not at all evident how a wireless transmission might be set up to obtain the best possible transmission, nor is there any explanation as to how this might be done.

U.S. Pat. No. 5,956,399 discloses a mounting unit for a portable telephone, in particular for a mobile telephone, whereby the mobile telephone is secured in the mounting unit simply by plugging it in and an electrical contact is established between the mobile telephone and the mounting unit. This enables the mobile telephone to be charged by means of the mounting unit and the telephone can also be operated whilst plugged into the mounting unit. The mounting unit is preferably built into a motor vehicle, and is thus provided in the form of what is known as a hands-free telephone, enabling the user to make a call without having to pick up the mobile handset.

A welding apparatus, cutting apparatus or similar is known from DE 297 15 751 U1, which has a housing and electronic equipment disposed in it and the housing has a control panel. The control panel is arranged on a separate control part and the control part can be removed from the housing but linked to the electronic equipment in the housing via a connecting cable or wirelessly for control purposes.

The objective of the invention is to propose a system and a method for running a welding process or a process of a related type, which increases the flexibility of the system and/or the components. Another objective of the invention is to obtain a very good signal and/or data transmission between components of the system or the installation.

This objective is achieved by the invention as a result of the features defined in the characterising part of claim 1. The advantage of this approach is that the communication module or modules can be mounted on different components, thereby resulting in short data transmission distances for a signal and/or data transmission, which can improve the transmission quality.

The embodiments defined in claims 2 and 3 make the system more flexible.

Also of advantage is the embodiment defined in claim 4. The advantage of this approach is that data is transmitted from a hard-wired data transmission system to a hard-wired data transmission system.

As a result of the advantageous embodiment defined in claim 5, the communication modules can be mounted and changed by a user very easily.

An advantageous embodiment of the mounting unit is described in claim 6, which prevents the communication module from inadvertently falling out or being removed.

Also of advantage is an embodiment defined in claim 7. The advantage of this is that the individual part-elements of the connection system can be connected in a manner which decreases their susceptibility to faults and dirt.

The advantage of an embodiment as defined in claim 8 is that once the communication module has been fitted by a user, no further measures are needed in order to connect the individual part-elements of the connecting mechanism.

The variants defined in claims 9 and 10 represent advantageous embodiments of the connecting system.

The advantage of claim 11 is that it enables the use of a data transmission system known from the prior art, which is widely used and not susceptible to errors.

The advantage of the embodiments defined in claims 12 to 14 is that the communication system can be operated without a licence and the user does not have to worry about conforming to legal requirements.

The advantage of an embodiment as defined in claim 15 is that a network can be used to exchange signals and/or data with other components at various different locations.

The advantage achieved as a result of the embodiment defined in claim 16 is that a connection can be established with a data network covering different regions, in particular a global data network, thereby enabling a trans-regional or global data exchange to be operated.

Claim 17 defines an advantageous power supply system for the communication module.

Claim 18 specifies an energy storage system of the communication module, the advantage of which is that the communication module can be used anywhere.

The advantage of the embodiment defined in claim 19 is that different types of data transmission can be operated in conjunction with one another between the hard-wired data transmission system and the wireless data transmission system.

Claim 20 defines an advantageous arrangement of the converter system.

The advantage of another embodiment defined in claim 21 is that data to be transmitted does not have to be despatched immediately but can be temporarily stored for subsequent processing or for transmission at a later point in time.

Irrespective of the above, the objective of the invention is also achieved by the features defined in the characterising part of claim 22. The advantage of this approach is that a more reliable data transfer can be run without the need for any complex systems because the communication module or modules can be mounted on different components to set up very short data transmission distances for a signal and/or data transmission and a communication network can be set up to suit local conditions.

The advantage of a useful feature defined in claim 23 is that data can also be transmitted to a remote or structurally separate system or a structurally separate component.

The advantage of the features described in claims 24 to 26 is that operation of the communication network is guaranteed to be in keeping with legal requirements and regulations governing transmission systems of this type.

Claim 27 defines an advantageous feature for integrating a widely distributed communication network.

The advantage of the features defined in claim 28 is that the signal or data transmission can be set up very flexibly, reducing the range across which the individual transmitter systems or transmitter units are required to transmit.

Claim 29 defines connection methods that are particularly useful in avoiding faults and dirt.

The advantage of the feature defined in claim 23 is that it offers different possibilities for forwarding data, whereby, for example, data blocks of differing structure can be adapted or tuned to one another.

The feature defined in claim 24 makes for a communication module that is particularly flexible.

The advantageous feature defined in claim 25 enables a communication system to be set up that is especially flexible and can operate independently of the welding apparatus.

The feature defined in claim 26 has an advantage in that it there is no need to provide an additional control and/or data line for every component to receive data.

As a result of the advantageous feature defined in claim 27, a signal and/or data transmission can be set up between components across part-distances by cabling and across part-distances by a wireless system, which means that a communication system can be set up in a very flexible manner and adapted to the conditions of the operating site.

The invention will be described in more detail below with reference to examples of embodiments.

OF THE DRAWINGS

Figure 1:
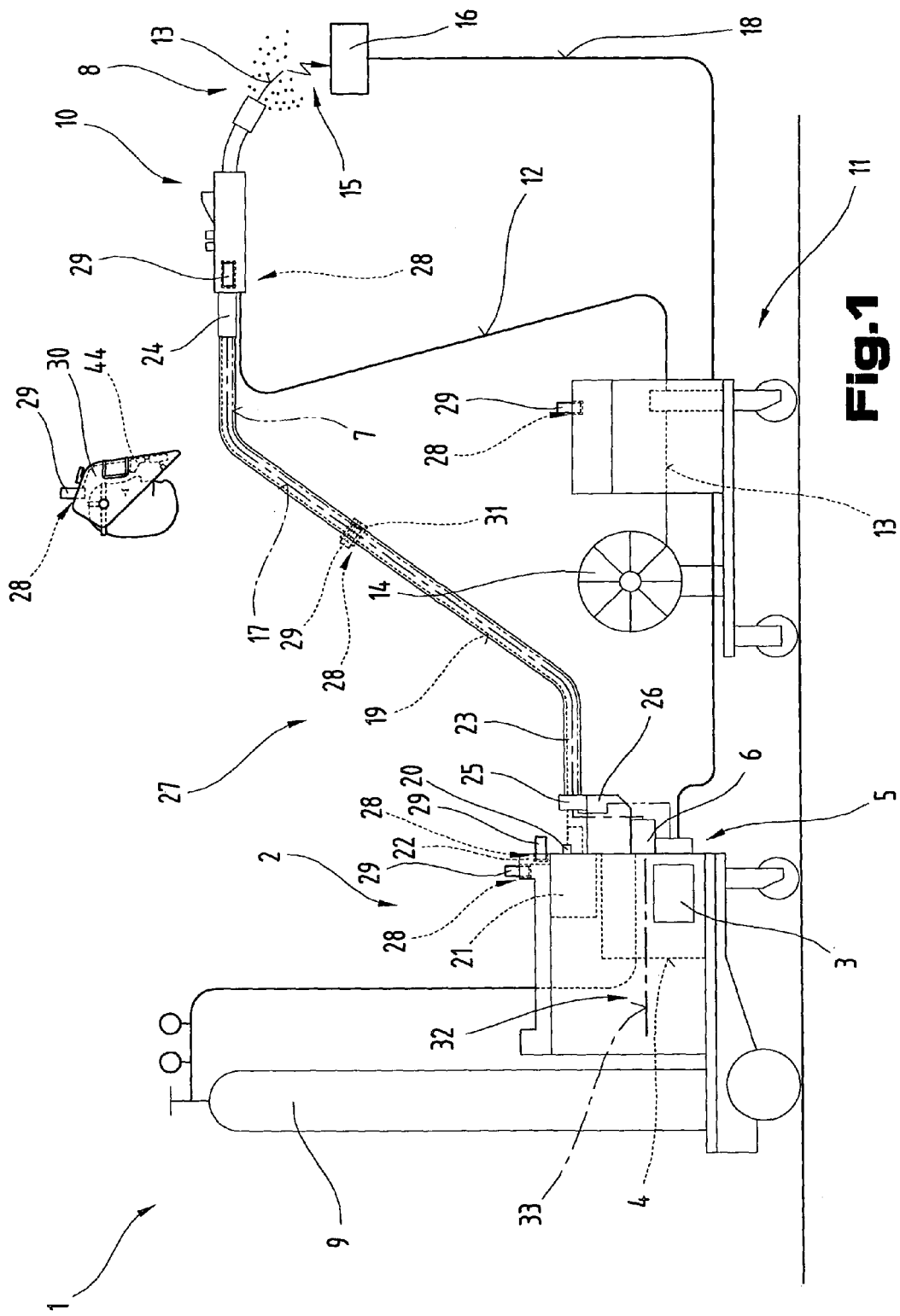
FIG. 1 is a schematic diagram depicting a system, in particular a welding apparatus or a welding machine.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a system for running a welding process. A welding plant or welding apparatus 1 is illustrated, with which a whole range of welding processes, e.g. MIG-MAG welding and WIG/TIG welding or electrode welding processes, etc. Clearly, the solution proposed by the invention may be used with a current source or a welding current source.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding device 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding device 1 also has an input and/or output device 22, by means of which a whole range of settings can be entered for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

In order to set up a modular communication system 27, mounting units 28 are provided on the various components of the welding device 1 in order to mount communication modules 29. These various components of the system or welding plant and the welding device 1 might include, for example, the welding torch 10 and/or the hose pack 23 and/or the control system 4 and/or the power source 2 and/or the wire feed device 11 and/or the welding mask 30 and/or the input/output device 22 and/or such like.

Naturally, it would also be possible to position other mounting units 28 for communication modules 29 at any other points on the welding device 1 or on any of its components. The drawings illustrate but one example of many possible variants, and in this particular instance the hose pack 23 is made up of several part-pieces connected via a coupling mechanism 31 and this coupling mechanism 31 is also provided with a mounting unit 28 to enable a communication module to be mounted on it as and when necessary, as indicated by broken lines.

At this stage, it should be explicitly noted that the solution proposed by the invention is not restricted to the embodiments illustrated as examples here, in other words applications involving welding apparatus and welding plants, but may also be used for running various types of related processes, such as soldering processes, for example, and/or for torch-cutting and/or such like.

Figure 2:
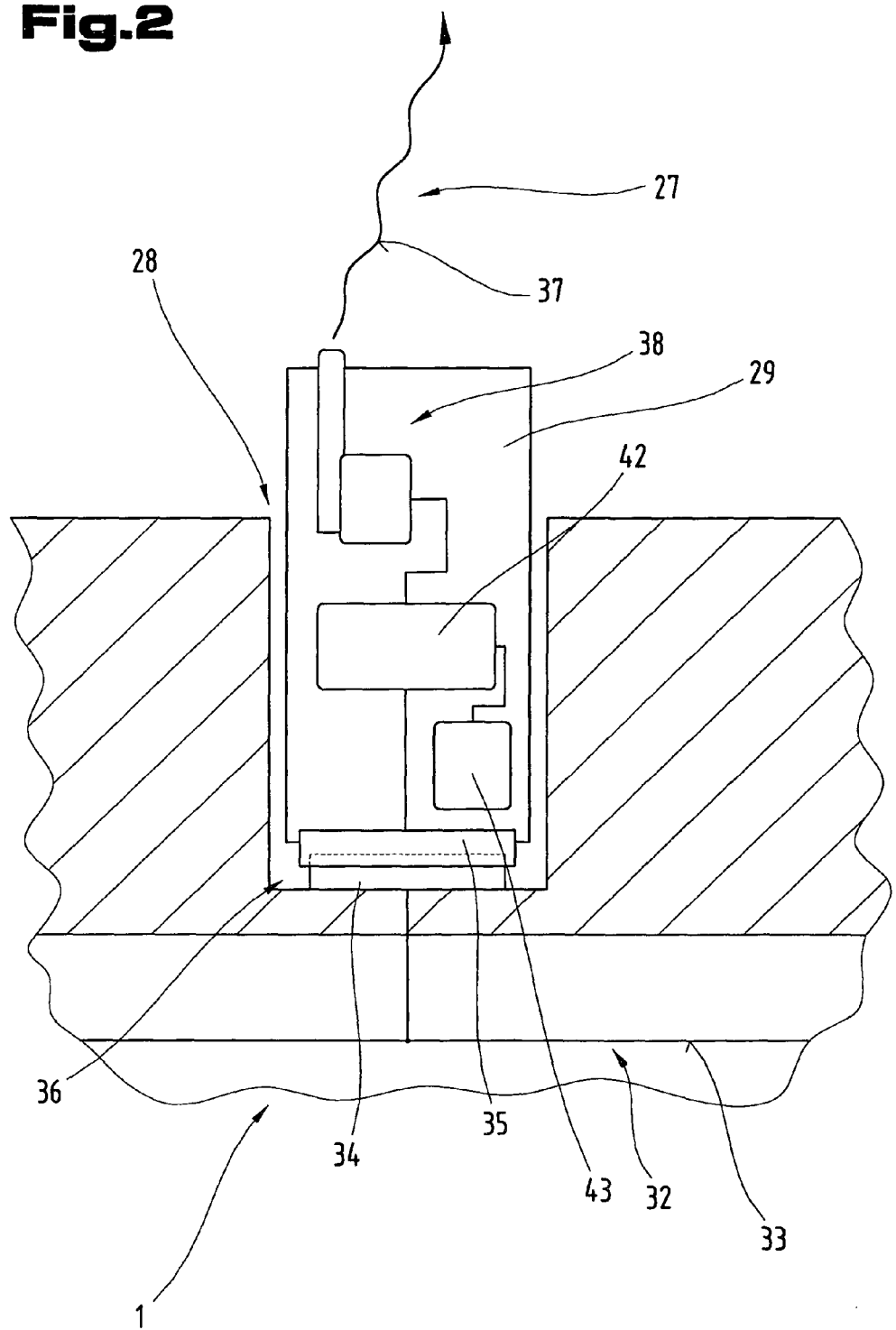
FIG. 2 shows an embodiment of the communication module in a component of a welding apparatus.

FIG. 2 illustrates one possible embodiment of the communication module 29, which is retained in a mounting unit 28 of a component of the welding device 1. In order to run a signal and/or data transmission between the communication module 29 and an internal data transmission system 32, in particular a bus system, such as field bus 33 for example, the component of the welding device 1 and the communication module 29 each has at least one complementary part-element 34, 35 of a connecting mechanism 36.

The mounting unit 28 may be of a design whereby the communication module 29 is slotted in or plugged in and is fitted with means to ensure that the communication module 29 can not inadvertently fall out or be removed. These means might be retaining claws or latch connections, for example. Another option would be to provide the mounting unit 28 with guide tracks or any other guide or positioning mechanism so that the communication module 29 can be inserted in an exact position. The important feature is that the communication module 29 can be inserted in the mounting unit 28 without any complex manoeuvring, i.e. very little time or effort is required and the system can be installed and replaced without much in the way of aids, and can be so in particular without the need for tools.

In addition to the signal and/or data transmission, this connecting mechanism 36 may naturally also be used as a means of supplying power to the communication module 29 via a power source disposed in a component of the welding device 1, in particular a direct voltage source.

The connecting mechanism 36 may be provided in the form of a serial or parallel interface, in particular a RS232 interface, of the type known from the prior art. The connecting mechanism 36 is advantageously configured so that when the communication module 29 is inserted in the mounting unit 28, it automatically establishes a connection between the communication module 29 and the respective component of the system or welding plant or welding device 1. The connection itself may be established by electrical or optical means, for example by infrared radiation.

Another possibility would be to provide the connecting mechanism 36 in the form of an infrared interface for signal and/or data transmission and an induction loop for supplying the communication module 29 with power. This being the case, the mounting unit 28 of the component of the welding device 1 and the communication module 29, in particular the part elements 34 and 35, would be provided with appropriate transmitter and/or receiver systems, although in order to retain clarity in the drawings, these are not illustrated.

In order to set up and communicate with a wireless data and communication network 37, the communication module 29 has a transmitter and/or receiver system 38. This transmitter and/or receiver system 38 is configured to transmit and/or receive signals, in particular radio signals.

The essential factor is that the transmission power of the transmitter and/or receiver system 38 is selected so as to be below a transmission power for which a licence would be required, which means that the transmitter and/or receiver systems 38 are inexpensive to set up and above all no licence is required to operate this transmitter and/or receiver system 38, in particular a post licence.

The transmitter and/or receiver system 38 may therefore be designed for a range of at most 100 m radius, preferably between 3 and 20 m.

The transmitter and/or receiver system 38 is also designed to transmit and/or receive at frequencies that are not subject to licensing regulations or frequencies which are specifically provided for and authorised for such applications. In view of the fact that different transmission outputs or frequencies are permitted in different countries and are authorised for applications of this type and since the associated conditions are also subject to change at any time, the transmitter and/or receiver systems 38 may be of different specifications for different countries.

The communication module 29, in particular the transmitter and/or receiver system 38, may be configured for outputting signals of different strengths or at different frequencies and the actual transmission power or frequency used can be set by micro-switches or with the aid of jumpers. Consequently, the transmitter and/or receiver system 38 can be adapted to the relevant power outputs or frequencies authorised for this type of application simply by switching the micro-switch or merely by plugging in the jumper. For practical purposes, this type of modification is preferably dealt with in the country for which the supply is intended.

To enable a signal and/or data transmission to be run across a distance greater than the range of a transmitter and/or receiver system 38, several communication modules 29 with transmitter and/or receiver systems 38 are used, in which case the first transmitter and/or receiver system 38 will function as a transmitter, the second transmitter and/or receiver system 38 will constitute the receiver and any number of transmitter and/or receiver systems 38 may be connected in between, which merely serve as a means of forwarding the communication, in other words, receiving, amplifying and forwarding the signals and/or data.

The communication module 29 may also incorporate a device 42, for adapting different data formats between the data transmission system 32 and the wireless data and communication network 37. To this end, the device 42 be connected via single-conductor or multi-conductor connecting lines to the part element 35 of the connecting mechanism 36 and the transmitter and/or receiver system 38.

The communication module 29 may also incorporate a memory unit 43, which can be used for temporarily storing data awaiting transmission and may be wired to the device 42.

Another possibility is to configure individual communication modules 29 as communication modules 29 specifically assigned to users. In other words, user-specific data can be stored in the memory unit 43 for the communication module 29, which can be assigned to a user, enabling this data to be retrieved by the user. In this connection, another possibility worth mentioning is that whereby a user of a welding device 1 will be assigned a communication module 29 containing user-specific data, for example welding settings, which is mounted in a welding torch 10 of the welding device 1, and this user-specific communication module 29 links up to the wireless data and communication network 37 so that data can be forwarded to other components of the welding device 1 and received from them, and the user will always be able to retrieve user-specific data stored in the memory unit 43, enabling the settings for the welding device 1 to be entered on the basis of this data.

Operating Principle:

As may best be seen by considering FIGS. 1 and 2 in conjunction with one another, a welding device 1 may incorporate a plurality of components and have mounting units 28 for communication modules 29 at various points.

At least some of the mounting units 28 have part-elements 34 of connecting mechanisms 36. The connecting mechanism 36 may be used for operating a signal and/or data transmission from the data transmission system 32 disposed in at least one of the components of the welding device 1, in particular a field bus 33, to the communication module 29 and/or to its power supply. However, it would also be possible to fit components of the welding device 1 with a mounting unit 28 only but no connecting mechanism 36, in which case the mounting units 28 would be used solely to mount a communication module 29 but this communication module 29 would not be directly connected to the data transmission system 32, in particular the field bus 33 of the component, and the communication module 29 itself may also have an internal power storage, for example a battery or an accumulator, in order to supply the power. These communication modules 29 would be used solely for the purpose of shortening the distance across which a communication module 29 has to transmit signals and/or data. This system of receiving, amplifying and forwarding signals and/or data is known from the prior art, for example from relay stations used for radio systems or mobile telephone networks.

The array of different components to be provided or fitted with communication modules 29 may be selected depending on the local conditions under which the system or welding device is set up. Care need only be taken to ensure that a signal and/or data exchange between different components is handled by a sufficiently high number of communication modules 29 with transmitter and/or receiver systems 38 and the range of a transmitter and/or receiver system 38 is not exceeded.

The modular communication system 27 may be used for a two-way transfer or transmission of data and/or signals between the internal data transmission system 32, disposed in the welding device 1 or in the welding system and provided as a bus system for example, and the wireless data and communication network 37. A two-way onward transmission of data is in turn run across the wireless data and communication network 37 to another component, which will then provide further processing or a display or output. However, it would also be possible to regulate and control this component on the basis of the transmitted data. Normally, only one bus system or only one internal data transmission system 32 is provided in a system or in a welding system or a welding device 1. However, it would also be possible to provide different data transmission systems 32, in particular bus systems, in different components, which can then be linked across the wireless data and communication network 37. The only important thing is that a data transmission takes place from a hard-wired data transmission system 32 to a hard-wired or wireless data and communication system 37 or vice versa.

If a user wants to build a modular communication system 27 between different components of the welding device 1, he will equip each of these components with a communication module 29 to enable a mutual data exchange.

Such a data exchange might take place between the control system 4 and the welding mask 30, for example, and may be made available by means of a display system 44 on its internal face or by any other input and/or output device.

Another signal and/or data exchange can be run between the control system 4 and the wire feed device 11, for example, and/or between the control system 4 and the input and/or output device 22.

In order to be able to bridge bigger distances between the individual components of the welding device 1, one or more additional communication modules 29 may be provided between the two communication modules 29 intended to communicate with one another, in order to receive, amplify and forward the transmitted signals and/or data.

To run a signal and/or data exchange between the control system 4 and the welding mask 30, for example, the coupling mechanism 31 and the welding torch 10 can be fitted with a communication module 29 in addition to the control system 4 and the welding mask 30. In the case of a one-way data flow, the communication module 29 of the control system 4 will act as a "transmitter", the communication module of the coupling mechanism 31 and the welding torch 10 will be used merely for forwarding purposes and the communication module 29 of the welding mask 30 will act as a "receiver".

In view of the fact that a communication module 29 may be located within the reception range of several other communication modules 29 of other components of the welding device 1, it may be that commands will be processed in parallel. In order to ascertain that this is the case, it is of practical advantage to issue a command serial number prior to each transmission of data and before transmitting.

A signal and/or data block awaiting transmission may consist of a code representing the communication module 29 and an incrementing command number, followed by the signals and/or data to be transmitted. When this data block is received by another communication module 29, the latter can determine the communication module 29 from which the data was sent along with the running command number allocated to this transmission. The ongoing command serial numbers may be issued on the basis of 000 to 999 in a constantly recurring endless loop.

If a communication module 29 then receives a transmission with the same running command serial number several times, it will know that it has already received this transmission from another communication module 29 and can ignore this transmission, since it was previously processed at an earlier point in time.

Naturally, it will be necessary to ensure that sufficient time has elapsed before the same continuous series of command numbers is allocated again to avoid issuing the same command numbers for a subsequent and different job in too short a time. To this end, it may be necessary to use continuous command numbers with four or six digits, for example.

Another possibility would be for the data blocks to incorporate priority bits. This would ensure that if several data blocks were to arrive at the transmitter and/or receiver system 38 of the communication module 29 at the same time, the incoming commands would be processed in order of importance.

Transmission of these data blocks may be synchronised in time or they may advantageously not be time-synchronised.

When the transmission of data blocks is operated on a non-time-synchronised basis, this is referred to as the ALOHA principle, which is particularly well suited to a system with low data rates and a lot of transmitters.

In accordance with the ALOHA principle, a transmitter and/or receiver system 38 is able to access the wireless data and communication network 37, in particular a radio channel of this data and communication network 37, at any time, in other words directly and without an authorisation signal, which means that the transmitter and/or receiver systems 38 will not need complex systems to co-ordinate access, making the communication module 29 more compact and less expensive to set up.

In order to transmit across several channels, it would also be possible to send data blocks across the data and communication network 37 by time-division or frequency-division multiplexing.

Figure 3:
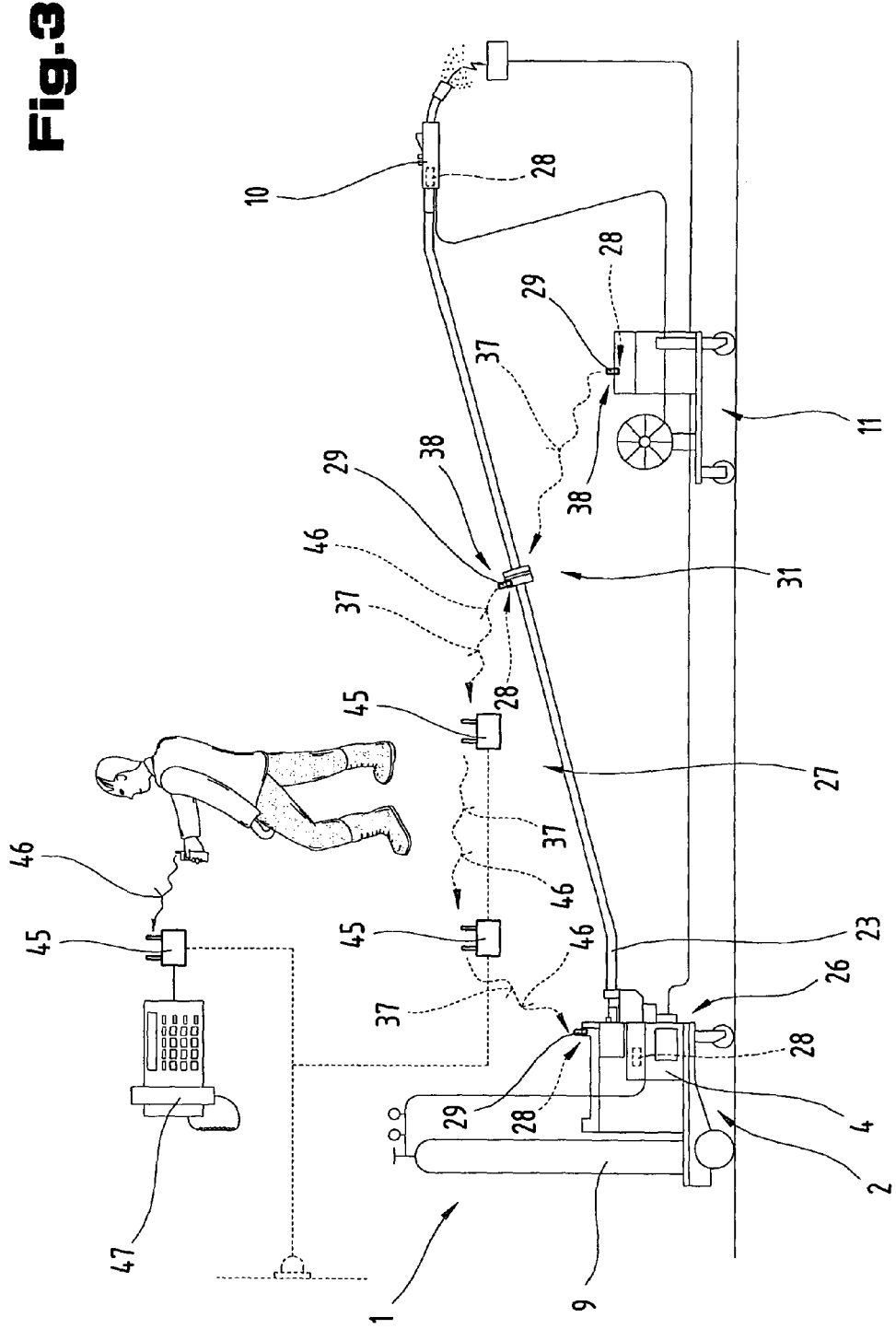
FIG. 3 is a diagram illustrating a modular communication system between different components of a system or welding apparatus.

FIG. 3 illustrates a welding device 1 with an external wire feed device 11 and in this instance the wire feed device 11 and the welding torch 10 of the welding device 1 are arranged at a greater distance away from the other components of the welding device 1, for example the control system 4 and the power source 2. In order to be able to set up a modular communication system 27 between the wire feed device 11 and the control system 4, each of these two components is fitted with a communication module 29. For practical purposes, these communication modules 29 are disposed at the highest point of the housing 26 and at the highest point of the wire feed device 11, in order to obtain the best transmission quality.

The coupling mechanism 31 of the hose pack 23, which consists of two parts, can also be fitted with a communication module 29. In order to be able to bridge a bigger distance between the communication module 29 of the coupling mechanism 31 and the communication module 29 of the control system 4, for which the transmission capacity of the individual transmitter and/or receiver system 38 of the communication modules 29 would not be adequate, transmitter and/or receiver units 45 such as a wireless telephone network 46 of a telephone system 47 can be used for the signal and/or data transmission between the components of the welding device 1, for example.

In this instance, therefore, the wireless data and communication network 37 would be directed at least partially across the wireless telephone network 46. Naturally, the transmitter and/or receiver systems 38 would have to be able to communicate with the transmitter and/or receiver units 45 in this instance, i.e. the frequencies of the transmitter and/or receivers would have to be tuned to one another and the transmitter and/or receiver system 38 and the transmitter and/or receiver units 45 would have to be configured to transmit and/or receive the same data blocks, in particular coding operated on the basis of the same algorithm and/or for processing the same run of command serial numbers.

The wireless telephone network 46 and the transmitter and/or receiver units 45 may be a standard, commercially available DECT system, for example. To provide the telephone system 47 and the transmitter and/or receiver units 45 with power, it is of practical advantage to link them to a power source, as indicated by broken lines.

Another possible way of setting up the wireless data and communication network 37 is to use transmitter and/or receiver units 45 designed to transmit data and/or signals specifically for a welding process or related processes rather than transmitter and/or receiver units 45 assigned to the telephone system 47, as described above. For example, it is preferable to use transmitter and/or receiver units 45 at various points or in a matrix arrangement in a room, for example an assembly hall, for transmitting signals and/or data for a welding process. The communication modules 29 may also be set up for operation with transmitter and/or receiver units 45. These might be described as communication modules 29 which are not disposed in any components of the system, in particular the welding plant.

Using the configuration of the modular communication system 27 illustrated in FIG. 3, it will be possible to transmit signals and/or data between the welding torch of the welding device 1 and the external wire feed device 11. Accordingly, control signals can be forwarded from the welding torch 10, for example on activation of a process control key, to the wire feed device 11, prompting a corresponding control or regulation to be activated, for example a wire feed rate to be applied. Naturally, the embodiment illustrated is just one of many possible variants. Another of many possible examples is a situation in which a signal and/or data transmission is run between the welding torch 10, in particular its process control key, and the control system 4 or the input and/or output device 22. It would also be possible, for example, for the delivery of gas to the welding torch 10 to be controlled and regulated by means of a signal transmitted across the data and communication network 37.

Figure 4:
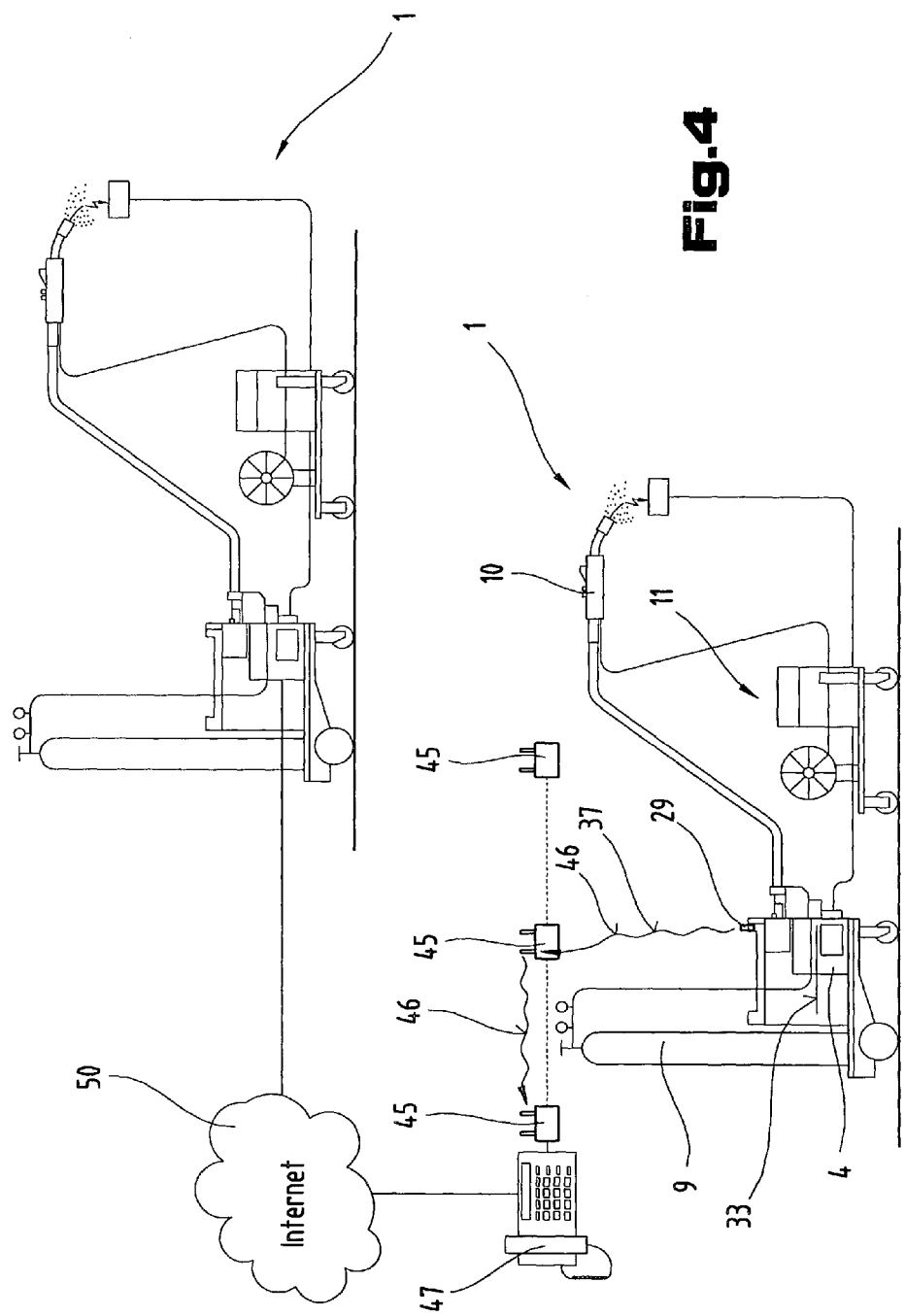
FIG. 4 is a diagram illustrating a modular communication system between different components of two systems or sets of welding apparatus.

FIG. 4 depicts two welding devices 1, one of which welding devices 1 is equipped with the communication module 29 communicating with the control system 4 via the field bus 33, for example, and a connection can be established across the data and communication network 37 and the wireless telephone network 46 between the communication module 29 and the telephone system 47 via the transmitter and/or receiver units 45. The telephone system 47 can in turn establish a connection to an intranet or the Internet 50. The Internet 50 communicates with the other welding device 1 so that data can be exchanged between the two welding devices 1 via the Internet 50, the telephone network 46 and the wireless data and communication network 37.

The other welding device 1 can be connected to the Internet 50 via other transmitter and/or receiver units 45 of another telephone system 47 and/or other transmitter and/or receiver system 38 of other communication modules 29, but it would also be possible to establish such a connection via a cable connection, for example by means of a telephone cable.

Accordingly, it is possible to link several systems, for example several welding systems or welding devices, which are structurally independent of one another and set up at different locations, in order to run a signal and/or data exchange.

For the sake of good order, it should finally be pointed out that in order to provide a clearer understanding of the welding device 1, it and its component parts are illustrated to a certain extent out of proportion and/or on an enlarged scale and/or on a reduced scale.

The independent solutions used to achieve the objectives of the invention may be found in the description.

Above all, the individual embodiments and features illustrated in FIGS. 1; 2; 3; 4 may be construed as independent solutions proposed by the invention in their own right. The associated objectives and the solutions proposed by the invention may be found in the detailed description of these drawings.

| | List of reference numbers |
|---|---|
| 1 | Welding apparatus |
| 2 | Welding current source |
| 3 | Power component |
| 4 | Control system |
| 5 | Switching element |
| 6 | Control valve |
| 7 | Supply line |
| 8 | Gas |
| 9 | Gas storage |
| 10 | Welding torch |
| 11 | Wire feed device |
| 12 | Supply line |
| 13 | Welding wire |
| 14 | Supply reel |
| 15 | Arc |
| 16 | Workpiece |
| 17 | Welding line |
| 18 | Welding line |
| 19 | Coolant circuit |
| 20 | Flow indicator |
| 21 | Water container |
| 22 | Input and/or output device |
| 23 | Hose pack |
| 24 | Connecting device |
| 25 | Tension-relieving device |
| 26 | Housing |
| 27 | (Modular) communication system |
| 28 | Mounting unit |
| 29 | Communication module |
| 30 | Welding shield |
| 31 | Coupling mechanism |
| 32 | Data transmission system |
| 33 | Field bus |
| 34 | Part-element |
| 35 | Part-element |
| 36 | Connecting mechanism |
| 37 | (Wireless) data and communication network |
| 38 | Transmitter and/or receiver system |
| 39 | — |
| 40 | — |
| 41 | — |
| 42 | Device |
| 43 | Memory unit |
| 44 | Display system |
| 45 | Transmitter and/or receiver unit |
| 46 | (Wireless) telephone network |
| 47 | Telephone system |
| 48 | — |
| 49 | — |
| 50 | Internet |

The invention claimed is:

1. A system for running a welding, soldering or torch-cutting process, which has at least one component which communicates wirelessly by means of at least one transmitter or receiver system with at least one transmitter or receiver system of another component of the system, wherein at least one component and the other component comprises a mounting unit, each transmitter or receiver system being contained in a communication module replaceably mounted in the mounting unit for inserting or changing the communication module, and the mounting unit has at least one connecting mechanism for connection to an internal transmission system or a power source of the system.

2. System as claimed in claim 1, wherein the component or components is or are a welding torch or a hose pack or a control system or a power source or a wire feed device or a welding mask or an input or output device.

3. System as claimed in claim 1, wherein the mounting unit comprises plug-in systems or latch connections.

4. System as claimed in claim 1, wherein the connecting mechanism is provided in a wireless arrangement by means of an induction loop or an infrared interface.

5. System as claimed in claim 1, wherein the connecting mechanism is a plug and socket connection which automatically establishes a contact when the communication module is placed in the mounting unit.

6. System as claimed in claim 1, wherein the connecting mechanism is electrically or optically connected to the internal data transmission system.

7. System as claimed in claim 1, wherein the communication module comprises a part-element of the connecting mechanism.

8. System as claimed in claim 1, wherein the internal data transmission system is a bus system.

9. System as claimed in claim 1, wherein the transmitter or receiver system of the communication module has a transmission capacity for a range of at most a radius of 100 m.

10. System as claimed in claim 1, wherein the transmitter or receiver system of the communication module is configured for establishing a wireless connection to a wireless telephone network.

11. System as claimed in claim 10, wherein the wireless telephone network is configured for establishing a connection to a trans-regional data network.

12. System as claimed in claim 1, wherein the power source to which the communication module is connected is disposed in a respective one of the components.

13. System as claimed in claim 1, wherein the communication module has an internal energy storage system.

14. System as claimed in claim 1, wherein the communication module comprises a device which adapts different data formats between the internal data transmission system and a wireless data communication network.

15. System as claimed in claim 14, wherein the device is disposed between a part-element of the connecting mechanism and the transmitter or receiver system.

16. System as claimed in claim 1, wherein the communication module comprises a memory unit for storing data.

17. A method of welding, soldering or torch-cutting, comprising wirelessly transmitting signals from a least one component of a system for running a welding, soldering or torch-cutting process to at least one other component of the system by means of a transmitter or receiver systems, wherein the at least one component and the at least one other component are replaceably mounted on a respective mounting unit, each mounting unit is connected by means of a connecting mechanism to an internal data transmission system, and at least one communication module is inserted in each mounting unit, whereafter a signal or data transmission is run via the transmitter or receiver system of a communication module in one of the mounting units to the communication module in the other mounting unit.

18. Method as claimed in claim 17, wherein the signal and or data transmission is run between components within a system or between components of different systems which are structurally independent of one another or disposed in separate locations.

19. Method as claimed in claim 17, wherein a range of the communication module is selected so as to be at most a radius of 100 m.

20. Method as claimed in claim 17, wherein a wireless telephone network is used in at least certain areas for communicating in the wireless data and communication network.

21. Method as claimed in claim 17, wherein the communication is effected or a communication forwarded in the wireless data and communication network by means of several transmitter or receiver system of several communication modules.

22. Method as claimed in claim 17, wherein data is picked up from an internal data transmission system and data is forwarded to the internal data transmission system of a component contactlessly by the communication module.

23. Method as claimed in claim 17, wherein different data formats received from the internal data transmission system and data to be forwarded to it are adapted by means of a device.

24. Method as claimed in claim 17, wherein the communication module is wirelessly supplied with power and regardless of location by means of an integrated energy storage system.

25. Method as claimed in claim 17, wherein the signal or data transmission is run by means of any number of communication modules, which are not disposed in any component of the system.

26. Method as claimed in claim 17, wherein the component of the system is regulated and controlled by means of the transmitted signals or data.

27. Method as claimed in claim 17, wherein data is picked up from the internal data transmission system wirelessly via a data and communication network or data is forwarded from the data and communication network to the internal data transmission system by means of the communication module.

28. Method as claimed in claim 17, wherein a signal or data transmission is run via the transmitter or receiver system to another transmitter or receiver system of another system for running a welding, soldering or torch-cutting process, or a transmitter or receiver unit of a telephone system.

29. Method as claimed in claim 17, wherein the communication is effected or a communication is forwarded in a wireless data and communication system by means of at least one transmitter or receiver unit of a wireless telephone network.

* * * * *